(12) United States Patent
Wirsam

(10) Patent No.: US 7,255,253 B2
(45) Date of Patent: Aug. 14, 2007

(54) METHOD AND EQUIPMENT TO DIVIDE GLASS PLATES INTO CUT PIECES

(75) Inventor: Bernd Wirsam, Linden (DE)

(73) Assignee: Albat & Wirsam Software Vertriebsgesellschaft mbH, Linden (DE)

( * ) Notice: Subject to any disclaimer, the term of this patent is extended or adjusted under 35 U.S.C. 154(b) by 29 days.

(21) Appl. No.: 10/319,696

(22) Filed: Dec. 16, 2002

(65) Prior Publication Data

US 2003/0127484 A1 Jul. 10, 2003

(30) Foreign Application Priority Data

Dec. 14, 2001 (DE) .................. 101 61 813

(51) Int. Cl.
*B65H 35/10* (2006.01)
*B26D 3/08* (2006.01)

(52) U.S. Cl. ............... 225/2; 225/94; 225/96; 225/96.5; 83/880; 83/53

(58) Field of Classification Search ........ 225/2, 225/96, 96.5, 97, 99, 100, 94, 103; 83/879, 83/27, 29, 89, 35, 102, 404.1, 53, 880

See application file for complete search history.

(56) References Cited

U.S. PATENT DOCUMENTS

| | | | | |
|---|---|---|---|---|
| 2,793,662 A | * | 5/1957 | Oholm | 83/104 |
| 2,948,991 A | * | 8/1960 | Walters et al. | 225/103 |
| 3,279,664 A | * | 10/1966 | Lynch | 225/96.5 |
| 3,338,123 A | * | 8/1967 | Nelson | 83/79 |
| 3,626,795 A | * | 12/1971 | White | 83/404.1 |
| 3,668,955 A | * | 6/1972 | Rupprecht et al. | 83/879 |
| 3,744,690 A | * | 7/1973 | Gray et al. | 225/96.5 |
| 4,140,258 A | * | 2/1979 | Gray | 225/2 |
| 4,203,334 A | * | 5/1980 | Zettler | 83/23 |
| 4,545,515 A | * | 10/1985 | Kozyrski | 225/96.5 |

(Continued)

FOREIGN PATENT DOCUMENTS

DE 4118241 6/1991

(Continued)

OTHER PUBLICATIONS

Internet Website: http://www.hegla.de/germ/presse4.htm.

*Primary Examiner*—Timothy V. Eley
*Assistant Examiner*—Jason Prone
(74) *Attorney, Agent, or Firm*—Clark & Brody

(57) ABSTRACT

A method of dividing glass plates for the purpose of reducing the required space in an interim buffer (80) reducing the transit times of different kinds of glasses, comprises generating a sequence of sub-plates (T) from the glass plates (P) stored in a blank plate storage (12), the consecutive sub-plates (T) of the sequence of sub-plates exhibiting identical or different material properties. Each sub-plate (T) is subdivided further by scribing and breaking-off until a desired cut piece has been attained. The generated cut pieces are deposited in a predetermined order in the interim buffer (80) and as called for are processed further. Equipment dividing glass plates into cut pieces accordingly entails that different cutting and breaking-off systems are preceded by at least one intermediate storage receiving at least two glass plates exhibiting different material properties and delivering a programmed sequence of sub-plates, the consecutive sub-plates exhibiting identical or different material properties.

18 Claims, 4 Drawing Sheets

U.S. PATENT DOCUMENTS

| | | | | |
|---|---|---|---|---|
| 4,871,104 A | * | 10/1989 | Cassese | 225/96.5 |
| 4,988,027 A | * | 1/1991 | Bremner | 225/2 |
| 5,007,317 A | * | 4/1991 | Jenkner | 83/256 |
| 5,529,564 A | * | 6/1996 | Hediger | 493/413 |
| 5,873,922 A | * | 2/1999 | Lisec | 65/112 |
| 6,601,490 B1 | * | 8/2003 | Gross et al. | 83/27 |
| 2002/0029671 A1 | * | 3/2002 | Gammerier et al. | 83/23 |
| 2004/0040997 A1 | * | 3/2004 | Ueyama et al. | 225/96.5 |

FOREIGN PATENT DOCUMENTS

| | | |
|---|---|---|
| DE | 4234536 | 4/1994 |
| EP | 1101742 | 5/2001 |
| JP | 06166530 | 6/1994 |
| WO | WO96/22948 | 8/1996 |

* cited by examiner

METHOD AND EQUIPMENT TO DIVIDE GLASS PLATES INTO CUT PIECES

FIELD OF THE INVENTION

The present invention relates to a method for dividing glass plates into cut pieces, and to equipment for practicing the method.

BACKGROUND ART

When cutting many common glasses to fixed sizes, the starting point as a rule shall be a glass plate of about 6,000×3,210 mm. The raw material is delivered on large A frames and is stored in sets on A or L frames in an uncut plate storage facility. Each glass plate is removed from among the sets at the storage facility by means of a portal crane or by other means and then is transferred to tipping table. By means of vacuum suction devices, said table moves the glass plate from the vertical into the horizontal position.

The glass plate moves from the tipping table onto a cutting table where it is properly positioned and then locked in place. This cutting table is fitted with a usually rotatable cutting head mounted on a two-dimensionally displaceable bridge and able to move in both directions and hence to cut the glass plate at will. The cutting plans, herein agendas, are calculated by a computer using a cut-piece optimizing program and are transferred through a circuit to the machine control device. If required, this device also is able to optimize the cut pieces if required.

Each blank plate initially is roughed out by so-called zero cuts near both transverse and longitudinal edges. Based on these straight reference lines, the cutting agenda predetermined by the cutting optimizing program shall then be carried out along the shortest possible paths by cutting along the x, y and z directions. Additional w-cuts apply to special sizes. Once the glass plate has been fully scribed, it shall be broken up into parts on a sequence of break-off tables.

A first break-off table is used to break off the x-cuts. For that purpose the entire glass plate is tensioned by means of rolls and as a result all the x-cuts will break off during the plate's transit. It is furthermore known to employ a break strip that is forced from below against the glass plate while it is being temporarily stopped. The removal of the sub-plates so made takes place at a higher speed than that of the feed and accordingly the individual plates shall be spaced apart. A second break-off table deflects the glass flow orthogonally and similarly then breaks off the y cuts. Then there is another deviation of the glass flow by 90° in order to break off the Z or W cuts on another table.

When all divisions have been made, all cut pieces are returned by a tipping table into the vertical and are moved to an interim buffer facility. This facility consists of A frames, L frames, compartments carriages and the like which are loaded according to the processing sequence in consecutive manner, for instance regarding a line of insulating glasses.

In order to minimize the space required of such substantially horizontally configured glass cutting facilities and in order to simplify the handling of the glass plates rising vertically both in the storage of the blank plates and also in the interim buffer, the patent document WO A196 22 948 proposed transporting, cutting and breaking all the glass material while it is in its vertical position.

For that purpose a glass table is removed from the blank plate storage and then is directly set up in a cutting table comprising a substantially vertically pointing support surface. A tipping table no longer being required, it may therefore be eliminated. The entire cutting program is then scribed on the cutting table by means of a cut piece optimizing program. Next all cut pieces shall be broken off at consecutive and also vertically configured break-off stations. Essentially the full glass transport shall be contained linearly within one plane. However each sub-plate or each cut piece requires being rotated by 90° in the vertical in order to configure vertically the cutting lines that shall be broken off in the next station. Once the last break off station has been crossed, the finished cut pieces are moved to the interim buffer.

This known glass cutting procedure incurs the substantial drawback that the full volume of one kind of glass must be continuously worked off in relation to the cutting agenda calculated by the cut-piece optimizing program, that is, only after a lot size on the average of 400 $m^2$ of individual glass has been entirely cut to size and without interruption will it be feasible to further process this production lot according to a sequential process. The glass panes that already have been finished are stored in the interim buffer. Illustratively regarding a line of insulating glass, when those already finished cut pieces must be combined with one or more panes of a different glass thickness and/or of different improvements, they must then wait relatively long for further processing, that is until the last kind of glass within the lot has been completely cut up. Such a wait may be as long as half a day and may entail delays in the further processing. The demand for space in the interim buffer is very high.

Another problem is incurred in that at the end of an optimizing run, an often substantially large residual plate shall remain on the cutting table and must be eliminated from the procedure by means of the tipping table or manually, before another kind of glass may be cut. Re-using such a residual plate in a sequential process most of the time is possible only by incurring substantial difficulty because of interference with the optimizing runs. Such conversion or adaptation may entail further delays. Accordingly a glass rupture or a high-speed event occurring in further processing can be cut only outside the conventional logic and hence in much time-delayed manner. The cost in labor is commensurately high, also the manufacturing costs.

As regards a cutting plant disclosed in the patent document DE 42 34 536 A1, the glass plates are moved automatically or manually into a vertically pointing pane support and are positioned via a horizontal transport path relative to a combined cutting, breaking and dividing equipment. Once the glass plate has been stopped, a vertical cut is implemented and the desired sub-plate is then broken off. Said sub-plate next is seized by a manipulator displaceable parallel to the transport path and then is rotated onto its cut edge and deposited in a subsequent temporary storage. If said sub-plate must be divided further, then first the residual plate shall be moved back into the pane support in order to thereafter newly position said sub-plate via the transport path underneath the cutting, breaking and dividing equipment. The part divided off is then seized by the manipulator which deposits it then in the temporary storage. This procedure is repeated until the final cut piece corresponds to the desired size. The temporary storage comprises an outlet which feeds the cut-off panes into subsequent processing. However the cut-off pieces also may be directly deposited into the storage structures of an interim buffer.

Such a procedure is hardly suitable for rationalized mass production. The conversion of the predetermined pane sizes into the required cutting lines does in fact take place by means of a programmed control system. The multiple production of substantially large panels however is just as problematical as the processing of different kinds of glass because the residual pieces always resting on the pane support require either being used according to some priority or being removed individually out of the cutting apparatus, thereby commensurately increasing the cost in time and labor. Therefore a support table always must be completely divided before a change in dimensions or materials may be carried out. The procedure for continuously feeding the manufacture of panes of insulating glass is commensurately unsuitable.

SUMMARY OF THE INVENTION

The objective of the present invention is to overcome the drawbacks of the state of the art, to very considerably reducing the space required to sort glass cut-pieces in the interim buffer, and to significantly reduce the transit times of different kinds of glass. Accumulation of residual glass shall be extensively averted and the handling of such residues shall be considerably reduced. Moreover the method of the invention overall shall react in flexible manner to malfunctions and shall always assure rational manufacture even of small lots.

Based on a method to divide glass plates into cut pieces, whereby each glass plate shall be processed by cutting and breaking-off systems, by being scribed and then broken off according to the particular desired cut piece, the finished cut pieces being temporarily stored in an interim buffer, the invention proposes making a series of sub-plates where said series the consecutive sub-plates exhibit identical or different material properties. Each sub-plate is further divided by scribing and breaking off during an ensuing processing until a desired cut piece has been attained. The cut pieces so made are deposited in a predetermined order in the interim buffer and if called for also shall be fed into processed further.

In this manner sub-plates of different glass types are supplied constantly (sub-plate dispensers) which may be made available in tight time sequences and as called for are processed further. If illustratively pairs of panes of different material properties are needed, then this need may be rapidly and conveniently met by inserting sub-plates of the corresponding material properties in alternating manner into the sequence of sub-plates. First one sub-plate of the first glass type shall be separated and stored in the interim buffer. During this time the ensuing sub-plate of the other glass type already may be cut. As soon as the desired panes meet in the interim buffer, they may be immediately fed to the subsequent processing for instance of an insulating glass line. No longer is it necessary to fully divide an entire stocked plate. Instead the interim buffer shall be constantly emptied. As a result the space required to sort the finished cut pieces in the interim buffer is very considerably reduced, with only advantageous consequence on the costs of production. Again the dwell time of the particular cut pieces in the interim buffer is substantially shorter than in the known methods and as a result the further processing may be rationalized further.

Another advantage of the method of the invention, which may be fully automated by a program control unit, is that the transit times are significantly shortened. As a result malfunctions during optimization and/or within the further processing may be dealt with rapidly and flexibly, namely by the program control unit inserting for instance a pane required for rapid action within the sequence of sub-plates. Even smaller lots of one glass type always may be rationally sub-divided and be incorporated into an ensuing manufacture. The remaining optimizing operation is hardly interfered with on that account because the particular sub-plates did transit in minimal time.

The method of the invention indeed offers more than only good cutting rates. On the contrary sequences may be attained during cutting that assure optimal input to the further processing by means of the interim buffer dynamics. Even in the presence of a daily mix of 5 to 6 kinds of glasses, the method of the invention allows synchronizing the optimizations of the particular kinds of glasses while the required space in the interim buffer always remains minimal.

On the average 4 sub-plates per stock plate are produced in the typical size mixes. Using the sub-plate dispensers the minimum size of the interim buffer is reduced to a pane area of 10 m$^2$.

FIG. 4 is a partial diagrammatical sideview similar to FIG. 2 showing an alternative cutting system.

The equipment generally denoted by 10 in FIG. 1 is used to divide glass plates into cut pieces and comprises a blank-plate storage 12 loaded with blank plates P which rest in packets distinguished by material properties on A or L frames 14. Material properties illustratively mean different glass thickness, kind and design of coating or improvement, tinting, color etc. The sizes of the glass plates P are about 6,000×3,210 mm. A removal system 16, for instance a portal crane, is able to access each individual glass plate P in the plate storage 12. The plates are picked up by omitted vacuum suction means and then are deposited consecutively and horizontally on a deposition table 18.

As regards equipment to divide glass plates into cut pieces and comprising one blank plate storage, at least one cutting and breaking-off system and an interim buffer to temporarily store the finished cut pieces for further processing, the present invention provides that at least one intermediate storage shall be associated to the cutting and breaking-off systems and shall receive at least two glass plates exhibiting different material properties and delivering a programmed sequence of sub-plates, the mutually consecutive sub-plates exhibiting identical or different material properties.

In surprisingly simple manner, the intermediate storage allows rapid and direct access to glass plates of different kinds of glasses. At the end of the cutting and breaking-off line, pairs or groups of panes may be constituted rapidly and in targeted manner in the interim buffer and the pairs may be directly processed further. As a result the required bulk in the interim buffer is substantially reduced over the case of the state of the art. At the same time the transit times of different glass kinds are very substantially reduced.

BRIEF DESCRIPTION OF THE DRAWINGS

Further features, details and advantages of the present invention are disclosed in the claims as well as in the following description of illustrative embodiments shown in the drawings.

DESCRIPTION OF THE PREFERRED EMBODIMENTS

Figure 1:
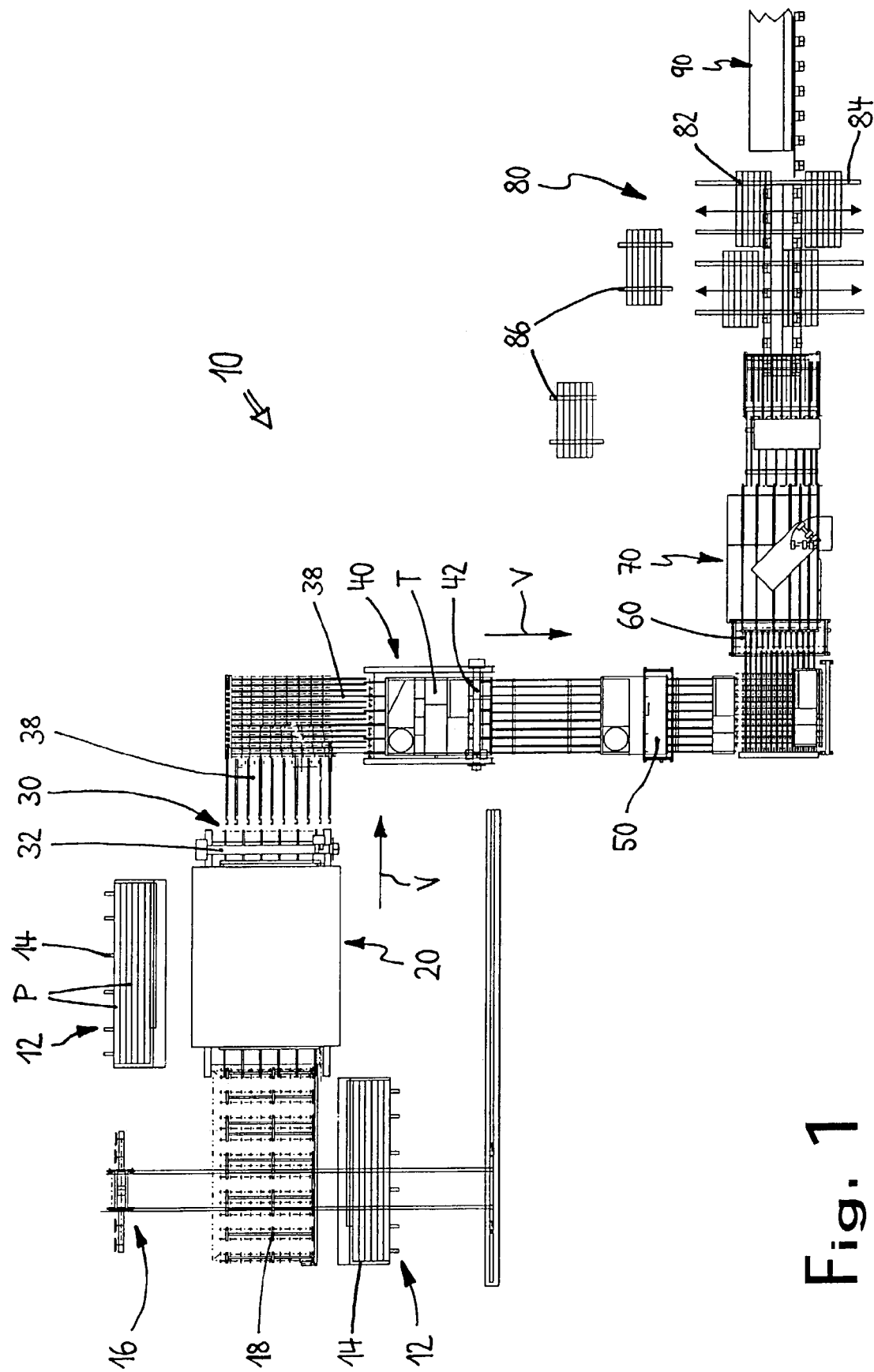
FIG. 1 diagrammatically shows equipment to divide glass plates into cut pieces.

The equipment generally denoted by 10 in FIG. 1 is used to divide glass plates into cut pieces and comprises a blank-plate storage 12 loaded with blank plates P which rest in packets distinguished by material properties on A or L frames 14. Material properties illustratively mean different glass thickness, kind and design of coating or improvement, tinting, color etc. The sizes of the glass plates P are about 6,000×3,210 mm. A removal system 16, for instance a portal crane, is able to access each individual glass plate P in the plate storage 12. Said plates are picked up by omitted vacuum suction means and then are deposited consecutively and horizontally on a deposition table 18.

The plates P are moved from the deposition table 18 to an intermediate storage 20 using rollers 19. The intermediate storage is designed in magazine-like manner with several superposed receiving compartments 22. Each receiving compartment 22 is associated to a predetermined kind of glass, and up to ten receiving compartments 22 may be configured in mutually superposed manner. In the present instance a total of seven compartments 22 is combined into one magazine 20 which accordingly may accept up to seven different glass plates P. The association of one kind of glass to a specific receiving compartment 22 is implemented by an omitted programmed control which moreover may calculate or optimize cutting agendas. All data are transmitted from an omitted computer through a circuit to the machine control of the equipment 10.

Figure 2:
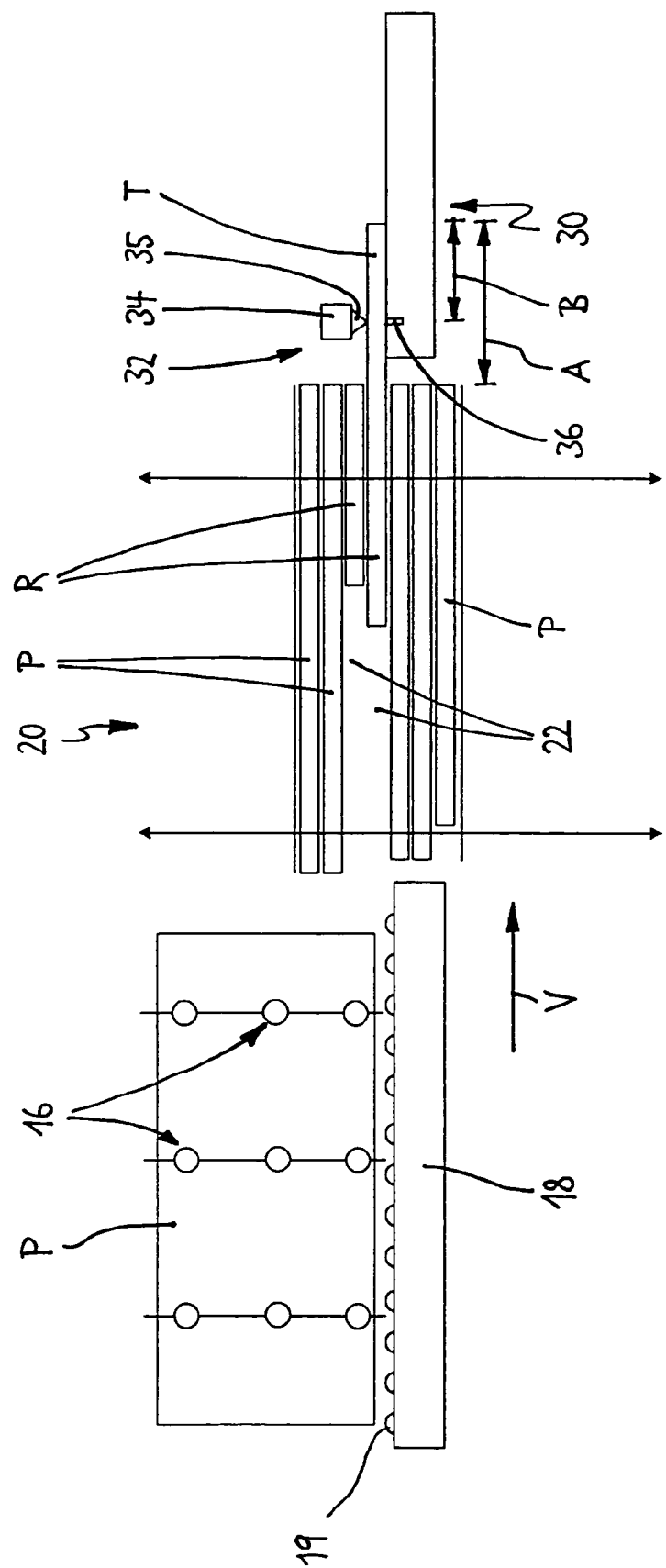
FIG. 2 is a diagrammatic sideview of an intermediate storage, and FIG. 3 diagrammatically shows another embodiment mode of equipment dividing glass plates into cut

As shown in FIG. 2, the entire storage magazine 20 is vertically displaceable by an omitted drive and as a result each receiving compartment 22 can be loaded from the deposition table 18 with the particular glass plate P passing by. The corresponding feed of the glass plates P from the blank-plate storage 12 onto the deposition table 18 is coordinated by the program control. To allow handling the glass plates P inside the individual receiving compartments 22, each of latter integrates an omitted transport device.

A first cutting table 30 is present directly following the magazine 20 and is fitted with a combined cutting and break-off system 32 to separate individual sub-plates T from the glass plates P temporarily stored in the magazine 20. Said cutting and breaking-off system includes a cutting bridge 34 itself comprising a longitudinally displaceable cutting head 35 that shall scribe the glass plates P as well as a break-off strip 36 situated underneath the cutting bridge 34, latter allowing breaking-off a glass plate P immediately following scribing.

Each glass plate P resting in the magazine compartments 22 is moved by raising or lowering the magazine 20 perpendicularly to the glass plates P, i.e. to the transport direction V to a height above the cutting table and thereupon is moved by the transport system by a required length A out of its receiving compartment 22. The length A in this instance is calculated by the program control and selected in such a way that following stopping the glass plate P, the cutting head 35 shall be able to exactly scribe the desired sub-plate width B. Thereupon the sub-plate T is immediately broken off by the breaking system 36 and removed in the transport direction V.

The control of the vertical motion of the magazine 20 also is assumed by the program control as well as the ejection of the glass plates P from the particular receiving compartment 22. The residual plate R produced after separating the sub-plate T initially stays in its receiving compartment 22. To the extent required, it will be retracted from the transport system into the magazine 20 in order that this magazine be freely displaceable vertically up and down for the separation of the next sub-plate T. However the cutting and breaking-off system 32 also may be integrated in such manner into the magazine 20 as to make any retracting motion of the residual plate R unnecessary. Each residual plate R may be subdivided further in the above described manner into further sub-plates T.

FIG. 2 shows that the cutting table 30 is situated horizontally in the same plane as the deposition table 18, that is, a glass plate P inserted from there into a receiving compartment 22 arrives in the absence of any displacement of the magazine 20 directly onto the cutting table 30. Accordingly, if in a given series only two different kinds of glass are being processed and are deposited into adjacent receiving compartments 22, then the magazine 20 will require only minimal displacement—namely only by the extent of the height differential between these two receiving compartments 22. If the remaining receiving compartments 22 were loaded beforehand with further kinds of glass, then these further kinds of glass in the course of time may be subdivided, either as needed meantime or at the end of processing, into sub-plates T. The program control system again assumes the optimization and coordination of these motions.

Each fully separated sub-plate T is fed to a conveyor belt 38 which shall rotate it by 90° without otherwise changing it position and then is transferred to a second cutting table 40. There said sub-plate T it will be trued and stopped along the cut edge (not visible) generated at the first cutting table 30 of the cutting and breaking system 32.

The second cutting table 40 is fitted with an omitted cutting head rotatably supported on a bridge 42 that in turn is displaceable in two dimensions, said cutting head completely scribing the sub-plate T according to a cutting agenda associated with the program control and optimized for the particular kind of glass. The reference line is the cut edge produced at the first cutting table 30. The required Y and Z cuts are carried out in the shortest possible ways relative to the reference line. Additional W cuts may be used to attain special sizes. Once the sub-plate T has been fully scribed, it shall be completely broken off on a set of breaking-off tables 50, 60.

The first breaking-off table 50 breaks off the Y cuts. Next a further deflection of the glass flow V takes place about 90° in order to break off the remaining Z or W cuts on the second break-off table 60. Breaking off the particular cut pieces may be implemented by passing over rollers or using break-off strips. The removal of generated particular cut pieces takes place at a somewhat higher speed than their feed rate and as a result a spacing is generated between the individual glass panes.

Once all cuts have been broken off, all cut pieces are returned by a rotating and tipping system 70 back into the vertical and moved into an interim buffer 80. This interim buffer consists of mutually displaceable compartment carriages 82, 84 which, according to the processing sequence in the further processing, for instance of a line of insulating glass 90, may be simultaneously loaded and emptied. The panes or cut pieces inside the interim buffer 80 are positioned by the program control system and as a result the excursions of the compartment carriages 82, 84 shall be minimized.

As shown, the magazine 20 jointly with the first cutting table 30 constitutes a sub-plate dispenser permanently delivering a series of sub-plates T. Within such a series, the sub-plates T may exhibit identical or different material properties, that is, different kinds of glass alternate in arbitrary sequences. In further processing, each sub-plate T is scribed individually on the cutting table 40 according to its associated cutting agenda and is broken off on the subsequent breaking-off tables 50, 60. The finished cut pieces are stored into the interim buffer 80 until completion of pairs or groups of panes has been reached for extant further processing 90. Independently of the continuing optimizations, the particular panes, after meeting individually or in sets, are subjected directly to further processing, as a result of which the interim buffer 80 need receive only a slight number of glass panes.

As regards the manufacture of insulating glass, this means for instance that a 4 mm float glass pane need wait only a short time in the interim buffer 80 for its coated mating part. Once the mating pane arrives and if at the same time the shipping order has been taken care of, both panes may be directly fed into the insulating glass line 90.

The program control system assumes the optimization of the entire procedure—from loading and organizing the intermediate storage 20 to the computation of the required cutting agendas of the particular sub-plates T. Based on the requirements in the particular further processing, the control system calculates and coordinates the sub-plate series to be delivered by the sub-plate dispenser 20, 30, the excursions of the removal system 16 in the blank plate storage 12, the intermediate storage 20 and of the compartment carriages 82, 84 in the interim buffer 80 being extensively minimized.

As regards special series or when manufacturing windows, for instance with ornamental glass insets, external cut pieces, glass panes or ornamental panes may be inserted anytime by means of A frames or further compartment carriages 86 into the interim buffer 80 and maybe subjected to further processing. Reversely, cut pieces that are not needed in for further processing or that shall be manually finished may be removed anytime from the interim buffer 80.

Figure 3:
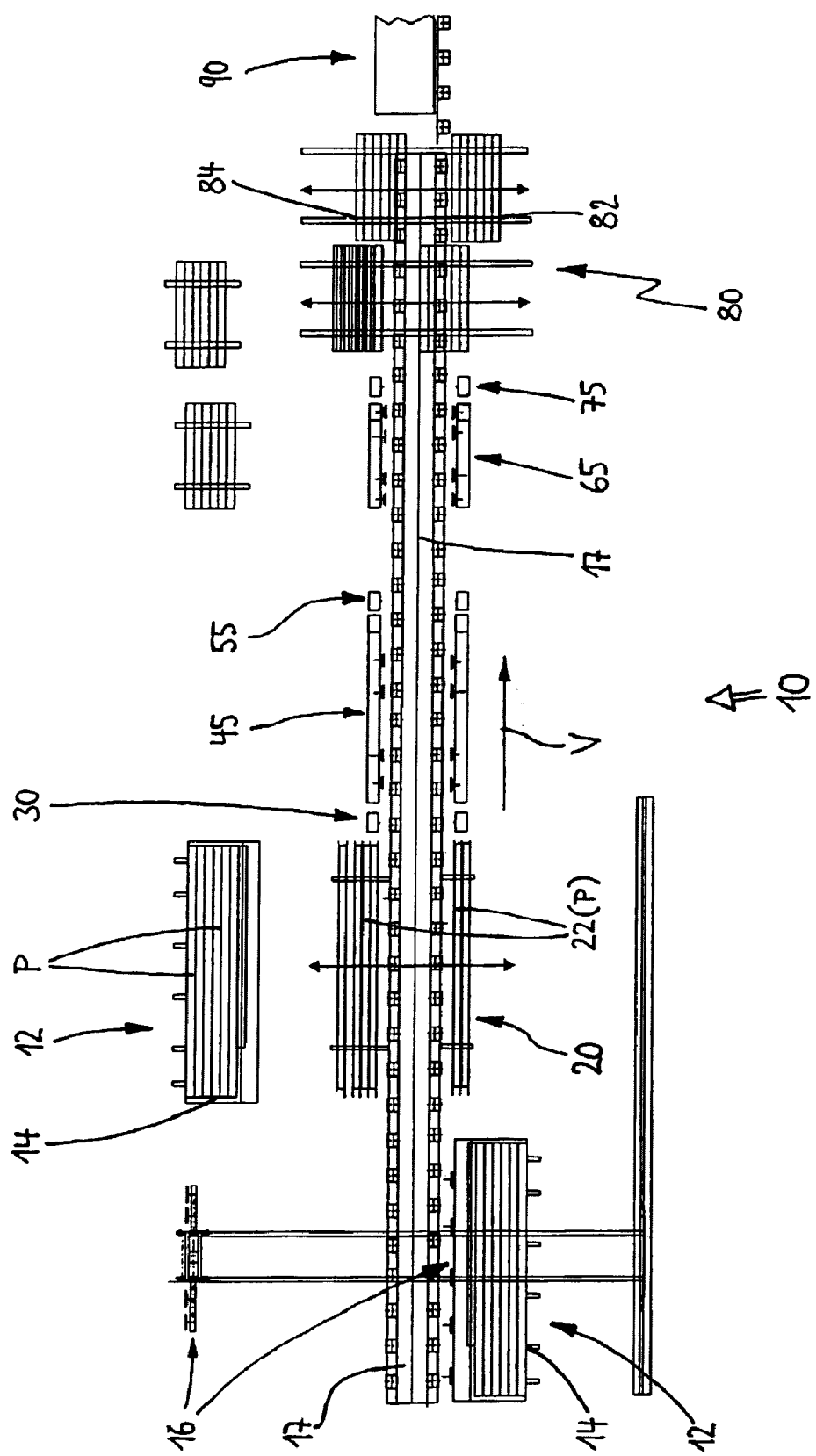

As regards an embodiment of the equipment 10 of the invention shown in FIG. 3, both the glass plates P and also the sub-plates and cut pieces derived from them are maneuvered vertically during the entire procedure. This feature offers the advantage that the glass plates P anyway resting vertically in the blank plate storage 12 no longer need to be tipped into the horizontal. As a result the deposition table 18, which in the vertical procedure is configured in front of the intermediate storage 20, may be eliminated entirely. The same considerations apply to the rotating and tipping system 70 which is configured in front of the interim buffer 80 and which erects the cut pieces that horizontally leave the break-off table 60 in order to allow inserting them into the compartment carriages 82, 84.

The removal system 16 removes the glass plates P from the blank-plate storage 12 and sets them down on their longitudinal edges directly onto a conveyor system 17, for instance a horizontal conveyor belt 17. The belt moves each glass plate P directly into the intermediate storage 20.

The interim storage 20 includes several receiving compartments 22 which are configured in parallel and juxtaposed manner and which are associated with different kinds of glass. Associating a kind of glass with a specific receiving compartment 22 is implemented by the program control system which furthermore coordinates the motion of the motor-driven intermediate storage 20 perpendicularly to the glass plates P. Consequently the glass plates P always are reliably sorted when being loaded and the desired sub-plates T or the series of sub-plates required by the further processing shall be reliably issued.

An omitted transport system is integrated to handle the glass plates P inside the individual single receiving compartments 22. However the magazine 20 also may be designed in a manner that the glass plates P shall always be moved by the conveyor belt 17. The cutting table 30—which is connected directly to the magazines 20 to implement the X-cuts also points in the vertical direction, that is, a glass plate P issuing from the intermediate storage 20 by a particular required path length A shall be vertically scribed by the cutting and breaking-off system 32 and then shall be immediately broken off.

The sub-plates T so generated are moved by the conveyor belt 17 or by another transport device to a rotating or pivoting system 45. The system 45 rotates each sub-plate T by 90° in the vertical and deposits it on the cutting edge (not visible) previously produced at the first cutting table 30 of the cutting and break-off system 32.

The sub-plates T move from the rotating system 45 to a second cutting system 55 which implements the Y cuts planned by the program control or the cutting agenda. Just as the first cutting table 30, this second cutting table 55 is fitted with omitted, combined cutting and breaking-off tools, i.e., the Y cuts shall be broken off immediately after scribing.

Once the Y-cuts have been broken off, the cut pieces so made are rotated vertically by 90° by a further rotating or pivoting system 65 in order that any Z and W cut still required be carried out in a third cutting system 75. By means of omitted cutting and break-off tools, said cutting system 75 after having set up the particular cut piece at the previously executed break-off edge shall implement the still lacking cuts in the vertical.

Once all cuts have been broken off, all cut pieces are moved by the transport system 17 directly into the interim buffer 80. The laterally displaceable compartment carts 82, 84 of said interim buffer receive the finished glass panes in an order predetermined by the program control.

The invention is not restricted to one of the above described embodiment modes, instead it may be modified in many ways. Illustratively as regards the vertical excursions, an omitted hoisting table may be configured in front of or between the deposition table 18 and the intermediate storage 20 and said hoisting table moves glass plates P, independently of the position of the intermediate storage 20 relative to the cutting table 40, from the deposition table 18 into the already emptied receiving compartments 22. Again the deposition table 18 and the cutting table 30 may be vertically offset from each other. Also the cutting table 30 may be moved relative to the intermediate storage 20 in such a way that latter, for instance on account of possibly larger mass, need not be displaced.

In a further embodiment of the present invention, several cutting/breaking-off lines 40, 50, 60, 70 resp. 45, 55, 65, 75 may be configured after the intermediate storage 20, that is, the sub-plate dispenser 20, 30 permanently feeds sub-plates which are fed alternatingly or intermittently to the particular processing lines 40, 50, 60, 70 resp. 45, 55, 65, 75. These lines each may terminate in a common or in a separate interim buffer 80.

In order to convert at low costs the method of the invention to already extant glass cutting facilities, the sub-plates T vertically separated on the cutting table 30 of the intermediate storage 20 of FIG. 3 may be moved into the horizontal on an ensuing tipping table (omitted). From there the sub-plates T may be processed further at the state of the art facility in conventional horizontal manner without entailing alterations in construction. Similarly a horizontal sub-plate dispenser 20, 40 of FIG. 2 may be used in a vertically operating glass cutting plant, namely by the sub-plates T generated on the cutting table 30 being moved into the vertical before further processing.

Figure 4:
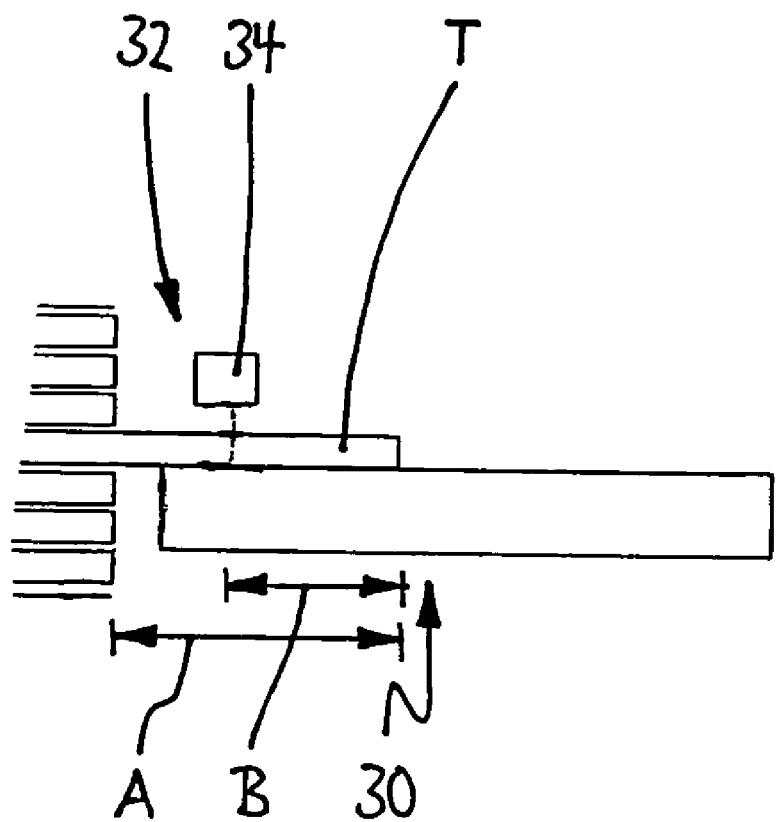
FIG. 4 shows another alternative cutting and breaking embodiment of the invention.

The particular cutting and break-off system provided at the cutting tables 40 resp. 30, 55, 75 may be supplemented by a grinding system as regards coated-glass processing and by an additional separation system as regards compound glass panes. Further separation devices, for instance saws, lasers or water jets also may be used individually or in combination. FIG. 4 shows an alternative cutting and breaking system using a separation device 34' such as a saw, laser, or water jet in place of the cutting bridge 34, cutting head 35 and break off strip 36.

In summary it may be concluded that blank stock plates P of different material properties are deposited in an intermediate storage 20 resp. are stored in interim manner. By means of relative motion in the vertical and/or in the horizontal, this intermediate storage allows rapid access to the individual stock plates P or to any residual stock plates R. A simple vertical or horizontal glass cutting machine is loaded from said magazine buffer, said machine always carrying out only an X-cut, the sub-plates T defined thereby being at once broken off by the machine 30. These sub-plates thereafter are divided in manner known per se by further Y, Z and/or W cuts.

Accordingly the procedure of glass cutting is resolved into at least two elementary steps, in that cutting and breaking-off the X cuts are separate in time and space from cutting and breaking-off the Y cuts. When cutting vertically, the sub-plates T may be rotated in bulk-economizing manner, whereas with respect to the horizontal procedure, they may be scribed conventionally using a single head cutter 42 and be broken off in ensuing operational stages. Therefore, as regards both procedures, only the X cut is carried out first. The residual plate R remains standing or prone in the intermediate storage 20 and as a result handling of residues shall no longer be required at least as regards commonplace kinds of glass.

As regards the less commonplace kinds of glass, the back motion of the residual plate R into the blank plate storage is no problem at that site on account of the small distance and the feasibility of transportation at the site. However the residual plate may remain in the intermediate storage 20 until the beginning of the next cut-piece optimization for the kind of glass involved and then may be taken into account again in setting the agenda. All residues R just as well as the separated sub-plates T are permanently monitored by the program control system.

The finished panes are moved in sequence into the dynamic buffer 80. This small buffer now only is used for short-term parking panes which are incompatible [out of sequence] with the production or packing sequence demanded in the further processing. Moreover panes that do not directly enter the automated further processing, may be moved out at this point. Also special panes, for instance ESG panes, VSG panes or ornamental glass panes, may be inserted through the interim buffer 80 into the further processing.

The interim buffer 80 preferably shall be in the form of two mutually displaceable compartment carriages 82, 84 which are dynamically filled with panes and simultaneously are again dynamically emptied. During insertion and also during removal, entire carriages 82, 84 may be exchanged. The panes are positioned in such a way within the interim buffer 80 that their excursions shall be minimized.

Alternatively the dynamic interim buffer 80 consists of a stationary magazine which on one side is loaded from a displaceable loading system and on the other side may be dynamically emptied by means of a corresponding system.

As regards manually cutting special glasses, optimization again may offer synchronized manual cut-piece lists without interfering with the other optimizing operations or without delaying them unduly.

In order that the bulk subtended by an interim buffer 80 be substantially reduced in a method dividing glass plates P into cut pieces and in order to significantly reduce the transit times of different kinds of glass, a sequence of sub-plates T is generated from glass plates P stored in a blank-plate storage 12, the mutually consecutive sub-plates T within the sequence exhibiting identical or different material properties. Each sub-plate T is further sub-divided by scribing and by breaking-off until the desired cut piece as been attained. The generated cut pieces are deposited in a predetermined order into the interim buffer 80 and as needed will be processed further.

Accordingly the equipment for dividing glass plates into cut pieces assures that at least one intermediate storage precedes various cutting and breaking-off systems, the intermediate storage receiving at least two glass plates exhibiting different material properties and delivering a programmed sequence of transfer panes, the consecutive sub-plates exhibiting identical or different material properties.

All features and advantages flowing from the claims, the specification and the drawings, including design details, spatial configurations and method steps, may be inventive per se as well as in the most diverse combinations.

REFERENCES LIST

A length
B width of sub-plate
P glass plate
R residual plate
T sub-plates
V direction of transport
10 glass cutting system
12 blank plate storage
14 A or L frame
16 removal system
17 transport system
18 deposition table
20 intermediate storage/magazine
22 receiving compartment
30 first cutting table
32 cutting and break-off system
34 cutting bridge
34' separation device
35 cutting head
36 break-off strip
38 conveyor belt
40 second cutting table
42 bridge
45 rotating/pivoting system
50 break-off table
55 cutting system
60 break-off table
65 rotating/pivoting system
70 rotating and tipping system
75 cutting system
80 temporary buffer
82 compartment carriage
84 compartment carriage
86 compartment carriage
90 insulating glass line

The invention claimed is:

1. In a method for dividing glass plates (P) into cut pieces, wherein each glass plate (P) is scribed and then is broken off in relation to the cut piece to be produced using cutting and breaking-off systems (30, 40, 50, 55, 60, 65, 75), and whereby finished cut pieces are temporarily stored in an interim buffer (80), the improvement comprising producing a series of sub-plates (T) from one or more of the glass plates (P) by scribing and breaking-off of the glass plate (P), wherein consecutive sub-plates (T) within each series exhibit identical or different material properties, wherein at least two glass plates (P) exhibiting different material properties are temporarily stored together in an intermediate storage (20), the glass plates (P) being fed from the intermediate storage (20) to the cutting and breaking-off system (30), the cutting and breaking-off system (30) generating exclusively X cuts, subdividing each sub-plate (T) by scribing and breaking-off of the sub-plate (T) until a finished cut piece has been attained, and depositing finished cut pieces in a predetermined sequence in the interim buffer (80) for further processing when required, wherein the step of producing the series of sub-plates (T) and the step of subdividing the sub-plates (T) into finished cut pieces are carried out concurrently and in different locations, and further wherein a residual plate (R) is generated when producing a sub-plate (T) from the glass plate (P), the residual plate (R) remaining in the intermediate storage (20) until a further sub-plate (T) from the glass plate (P) is separated.

2. The method of claim 1, wherein an arrangement of sub-plates (T) is established for the interim buffer (80) or for requirements of the further processing, the arrangement based on material properties of the sub-plates (T) in the arrangement, and the series of sub-plates (T) are produced according to the arrangement.

3. The method of claim 2, further comprising removing the finished cut pieces from the interim buffer (80) for further processing.

4. The method of claim 3, wherein the finished cut pieces are removed in sets.

5. The method of claim 1, wherein the subdividing step further comprises scribing the sub-plates (T) and breaking-off X cuts from the scribed sub-plates (T).

6. The method of claim 1, wherein the producing step further comprises:

providing a blank plate storage (12) for storing the glass plates (P);

removing the glass plates (P) from the blank plate storage (12) based on a desired material property; and feeding the removed glass plate (P) in sequence to the cutting and breaking-off system (30).

7. The method of claim 1, wherein the intermediate storage (20) is continuously filled with glass plates (P) from the blank plate storage (12).

8. The method of claim 1, wherein an X cut is made when producing a sub-plate (T), and further cuts selected from the group consisting of Y, Z, and W cuts are made to the X cut-containing sub-plate (T) using the X cut as the reference line for said further cuts.

9. The method of claim 1, wherein the interim buffer (80) includes one or more frames having an A-shape or an L-shape, or compartment carriages.

10. The method of claim 1, further comprising moving panes formed by systems other than cutting and breaking-off systems (30, 40, 50, 55, 60, 65, 75) into the interim buffer (80) for further processing.

11. The method of claim 1, wherein each glass plate is maintained in a vertical position during at least said producing step.

12. The method of claim 1, wherein each glass plate is maintained in a horizontal position during at least said producing step.

13. In a method for dividing glass plates (P) into cut pieces using one or more separation devices and whereby finished cut pieces are temporarily stored in an interim buffer (80), the improvement comprising producing a series of sub-plates (T) from one or more of the glass plates (P) using one or more of the separation devices on the glass plate (P), wherein consecutive sub-plates (T) within each series exhibit identical or different material properties, wherein at least two glass plates (P) exhibiting different material properties are temporarily stored together in an intermediate storage (20), the glass plates (P) fed from the intermediate storage (20) to a system using the one or more separation devices, the system generating exclusively X cuts, subdividing each sub-plate (T) using one or more of the separation devices on the sub-plate (T) until a finished cut piece has been attained, and depositing finished cut pieces in a predetermined sequence in the interim buffer (80) for further processing when required, wherein the step of producing the series of sub-plates (T) and the step of subdividing the sub-plates (T) into finished cut pieces are carried out concurrently and in different locations, and further wherein a residual plate (R) is generated when producing a sub-plate (T) from the glass plate (P), the residual plate (R) remaining in the intermediate storage (20) until a further sub-plate (T) from the glass plate (P) is separated.

14. The method of claim 13, wherein the one or more separation devices use cutting and breaking.

15. The method of claim 13, wherein the one or more separation devices involve a separation method other than cutting and breaking.

16. The method of claim 15, wherein the one or more separation devices include lasers, saws and water jets.

17. The method of claim 13, wherein each glass plate is maintained in a vertical position during at least said producing step.

18. The method of claim 13, wherein each glass plate is maintained in a horizontal position during at least said producing step.

* * * * *